(12) United States Patent
Chou (10) Patent No.: US 8,285,132 B2
(45) Date of Patent: Oct. 9, 2012

(54) VOICE COIL MOTOR, CAMERA MODULE AND PORTABLE ELECTRONIC DEVICE HAVING SAME

(75) Inventor: Tai-Hsu Chou, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/095,732

(22) Filed: Apr. 27, 2011

(65) Prior Publication Data
US 2012/0148222 A1 Jun. 14, 2012

(30) Foreign Application Priority Data

Dec. 10, 2010 (TW) .................................. 99143284

(51) Int. Cl.
G03B 3/10 (2006.01)
G03B 17/00 (2006.01)
(52) U.S. Cl. ........................................ 396/133; 396/529
(58) Field of Classification Search .................. 396/133, 396/529; 348/373, 374; 359/819, 821–823
See application file for complete search history.

(56) References Cited

U.S. PATENT DOCUMENTS

| 5,134,326 A * | 7/1992 | Sakamoto | 310/14 |
| 7,262,927 B1 * | 8/2007 | Shyu et al. | 359/823 |
| 2008/0204590 A1 * | 8/2008 | Toya et al. | 348/373 |

* cited by examiner

Primary Examiner — W. B. Perkey
Assistant Examiner — Minh Phan
(74) Attorney, Agent, or Firm — Altis Law Group, Inc.

(57) ABSTRACT

A voice coil motor includes a shell and a driving module in the shell. The shell includes a top plate. The driving module includes many magnets attached on the shell and defining a first receiving cavity, a movable unit movably received in the first receiving cavity, a bottom base, and a guiding post. The movable unit includes a movable barrel for receiving a lens module and a coil on the movable barrel. A central axis of the movable barrel is coaxial with an optical axis of the lens module. The movable barrel includes a first receiving portion. A central axis of the first receiving portion is parallel with the optical axis. The bottom base includes a second receiving portion. One end of the guiding post is received in the first receiving portion, and the other end of the guiding post is received in the second receiving portion.

15 Claims, 7 Drawing Sheets

VOICE COIL MOTOR, CAMERA MODULE AND PORTABLE ELECTRONIC DEVICE HAVING SAME

BACKGROUND

1. Technical Field

The present disclosure relates to motors and particularly, to a voice coil motor, a camera module having the voice coil motor and a portable electronic device having such camera module.

2. Description of Related Art

With the development of optical imaging technology, camera modules are widely used in a variety of portable electronic devices, such as mobile phones, and personal digital assistants (PDAs).

Some portable electronic devices, for example, third generation (3G) mobile phones, include camera modules. The camera modules use actuators to provide zoom and autofocus, for example, stepper motors. It is frequently necessary to use a gear assembly to transform the rotational movement of the actuators into linear movement. However, such gear assembly generally increases the bulk of the camera modules. Furthermore, the occurrence of backlash/recoil in the gear assembly may degrade focus accuracy.

Therefore, what is needed is a new motor and camera module using the new motor that can overcome the described limitations.

DETAILED DESCRIPTION

Embodiments will now be described in detail below with reference to drawings.

Figure 1:
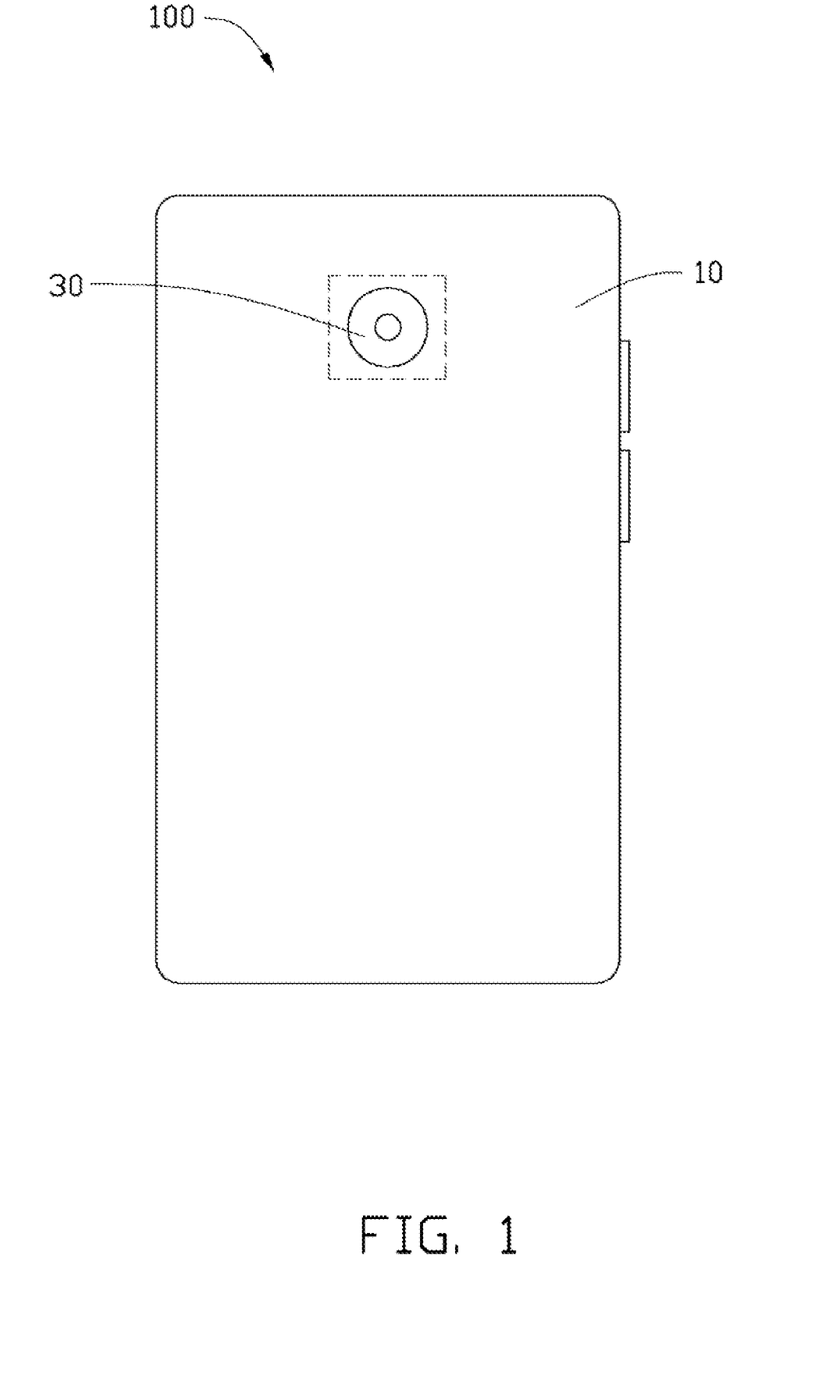
FIG. 1 is an isometric view of a portable electronic device according to a first embodiment.

Referring to FIG. 1, a portable electronic device 100, in accordance with a first embodiment, is shown. The portable electronic device 100 includes a main body 10 and a camera module 30 mounted on the main body 10.

Figure 2:
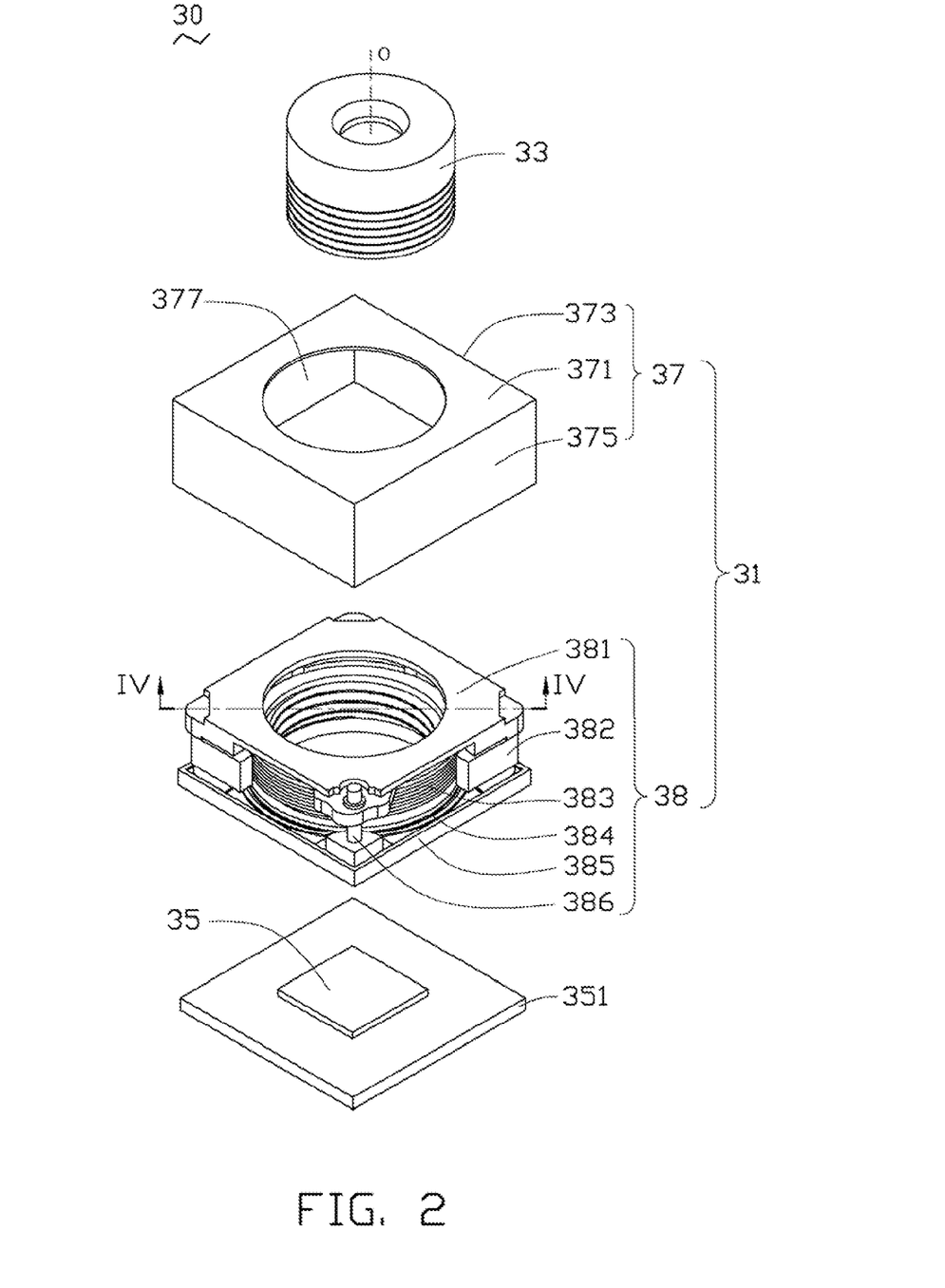
FIG. 2 is an exploded and isometric view of a camera module of the portable electronic device of FIG. 1, the camera module including a driving module having a movable unit.

Referring to FIG. 2, the camera module 30 includes a voice coil motor 31, a lens module 33 receiving at least one lens (not shown) therein, and an image sensor 35 mounted on a circuit board 351.

The voice coil motor 31 includes a shell 37 and a driving module 38 received in the shell 37.

The shell 37 is configured for protecting the lens module 33, the driving module 38 and the image sensor 35 from damage from impact. The shell 37 includes a top plate 371, two opposite first side plates 373, and two opposite second side plates 375. A through hole 377 is defined in the top plate 371, allowing light to pass therethrough. The top plate 371, the first side plates 373, and the second side plates 375 cooperatively define a receiving cavity (not labeled) for receiving the driving module 38 therein.

The driving module 38 includes a top lid 381, three magnets 382 attached on the top lid 381, a movable unit 383, a spring plate 384, a bottom base 385, and a guiding post 386. In the present embodiment, the guiding post 386 is made of metal material.

Figure 3:
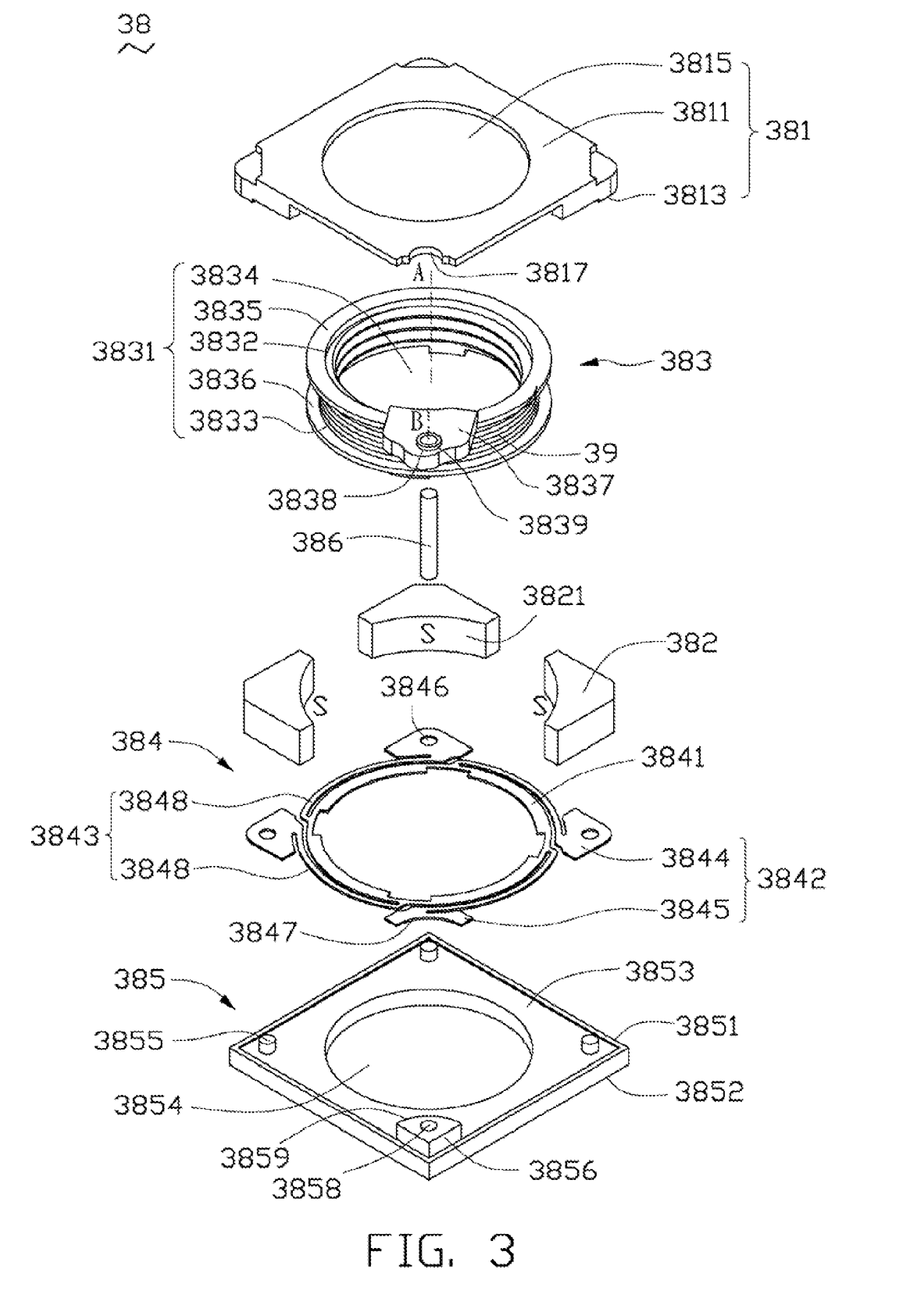
FIG. 3 is an exploded and isometric view of the driving module of the camera module of FIG. 2.

Referring also to FIG. 3, the top lid 381 includes an upper surface 3811 and a lower surface 3813 facing away from the upper surface 3811. The top lid 381 defines a through hole 3815 passing through the upper surface 3811 and the lower surface 3813. The through hole 3815 is configured for allowing light to pass the top lid 381. In the present embodiment, the top lid 381 is a square plate, and is attached on the inner surface of the top plate 371. In other embodiments, the top lid 381 may be attached on the inner surface of the first side plate 373, the inner surface of the second side plate 375, or the inner surfaces of the first side plate 373 and the second side plate 375.

In the present embodiment, the top lid 381 also defines a recess 3817 at a corner thereof for receiving an end of the guiding post 386. The recess 3817 is separated from the through hole 3815, and the opening of the recess 3817 is facing away from the through hole 3815. In alternative embodiments, the recess 3187 may be replaced by a through hole. In further alternative embodiments, the recess 3817 may be omitted if the guiding post 386 is shorter.

The magnets 382 are attached on the lower surface 3813. In the present embodiment, the magnets 382 are in the other there corners of the top lid 381. Each magnet 382 includes an arc-shaped lateral face 3821. The three lateral faces 3821 cooperatively define a first receiving cavity 3818 for receiving the movable unit 383. In the present embodiment, the magnetic pole of each magnet 382 at the corresponding lateral surface 3821 is identical to each other, and is south magnetic pole. In alternative embodiments, a single c-shaped magnet, a single ring magnet, or other shapes of magnets may replace the magnets 382. In further alternative embodiments, the magnets 382 may be attached on the bottom base 385. In still further alternative embodiments, the top lid 381 may be omitted. In such case, the magnets 382 can be attached on the inner surface of the shell 37.

The movable unit 383 is movably received in the first receiving cavity 3818. The movable unit 383 includes a movable barrel 3831 and a coil 39 wrapped around the outer sidewall of the movable barrel 3831.

Figure 4:
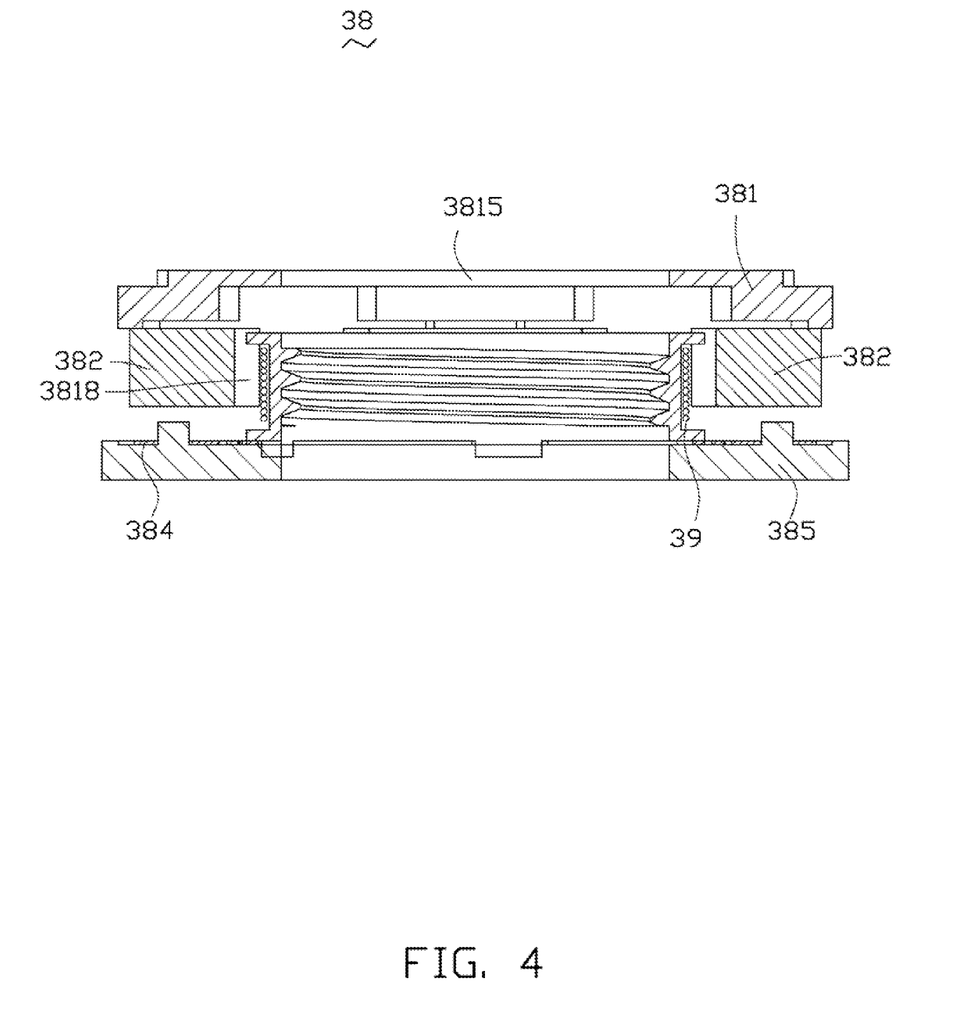
FIG. 4 is a cross-section of the driving module of the camera module of FIG. 2, taken along a line IV-IV thereof.

The central axis A of the movable barrel 3831 is coaxial with an optical axis O of the lens module 33. The movable barrel 3831 includes an upper end 3832 and a lower end 3833 facing away from the upper end 3832.

The movable barrel 3831 defines a second receiving cavity 3834 passing through the upper end 3832 and the lower end 3833. The movable barrel 3831 also includes an upper endplate 3835 outwardly extending from the upper end 3832 along a circumferential direction of the second receiving cavity 3834, and a lower endplate 3856 outwardly extending from the lower end 3833 along the circumferential direction of the second receiving cavity 3834. In the present embodiment, the movable barrel 3831 is made of plastic.

The top endplate 3835 includes a first receiving block 3837 outwardly extending from the top end plate 3835. The first receiving block 3837 defines a first receiving portion 3838. The central axis B of the first receiving portion 3838 is parallel with the optical axis O. The first receiving block 3837 also includes a metal receiving ring 3839 received in and coaxial with the first receiving portion 3838. The metal receiving ring 3839 is configured for receiving the guiding post 386, such that the guiding post 386 can guide the movable barrel 3831 to move along the optical axis O. In the present embodiment, the first receiving portion 3838 is a through hole passing through the first receiving block 3837. In alternative embodiments, the first receiving block 3837 may be arranged on the bottom endplate 3836. In further alternative embodiments, the first receiving portion 3838 may be replaced by a recess defined in the first receiving block 3837, with the opening of the recess facing the bottom base 385. In still further alternative embodiments, the metal receiving ring 3839 may be omitted. In such case, the movable barrel 3831 or the first receiving block 3837 is made of metal.

The coil 39 is between the upper endplate 3835 and the lower endplate 3836. A magnetic field generated by the coil 39 with electric current flowing therein interacts with a magnetic field generated by the magnets 382 to drive the movable barrel 3831 to move along the guiding post 386 (i.e. the optical axis O).

The spring plate 384 includes a first fixed portion 3841, a second fixed portion 3842, and a spring connecting portion 3843 connecting the first fixed portion 3841 to the second fixed portion 3842. The first fixed portion 3841 is fixed on the bottom end 3833 of the movable barrel 3831.

The second fixed portion 3842 is fixed on the bottom base 385. The second fixed portion 3842 includes three spaced first fixed blocks 3844 and a second fixed block 3845. Each first fixed block 3844 defines a first locating member 3846. The second fixed block 3845 includes a first locating lateral face 3847 facing away from the first fixed portion 3841. In the present embodiment, the first locating member 3846 is a locating hole, and the first locating lateral face 3847 is an arc-shaped lateral face.

In alternative embodiments, the first locating member 3846 may be a locating post, and the first locating lateral face may be an L-shaped lateral face, an S-shaped lateral face, or a lateral face of other shapes. In further embodiments, the first fixed blocks 3844 and the second fixed block 3845 may be connected to each other to form a ring-shaped structure. In still further embodiments, there may be one first fixed block 3844, two first fixed blocks 3844, four first fixed blocks 3844 or more first fixed blocks 3844.

The spring connecting portion 3843 includes four spring arms 3848. One end of each spring arm 3848 is connected to the first fixed portion 3841, and the other end of each spring arm 3848 is connected to one first fixed block 3844 or the second fixed block 3845. In other embodiments, there may be two, three, five or more spring arms 3848.

When the movable barrel 3831 moves, the spring arms 3848 deform and can supply restoring forces to the movable barrel 3831.

The bottom base 385 includes an upper surface 3851 and a lower surface 3852 facing away from the upper surface 3851. A recess 3853 is defined in the upper surface 3851. The bottom base 385 defines a through hole 3854 passing through the bottom of the recess 3853 and the lower surface 3852, allowing light to pass therethrough. The bottom base 385 also includes three second locating members 3855 spatially corresponding to the respective first locating members 3846, and a second receiving block 3856 on the bottom of the recess 3853. In the present embodiment, each second locating member 3855 is a locating post. In other embodiments, the recess 3853 may be omitted. In such cases, the second locating members 3855 are directly arranged on the upper surface 3851.

The second receiving block 3856 defines a second receiving portion 3858 for receiving the end of the guiding post 386, which is near the bottom base 385. In the present embodiment, the second receiving portion 3858 is a recess, and the end of the guiding post 386, which is near the bottom base 385, is securely received in the second receiving portion 3858. In alternative embodiments, the second receiving portion 3858 may be a through hole. In further alternative embodiments, the end of the guiding post 386, which is near the bottom base 385, may be movably received in the second receiving portion 3858. In such cases, the end of the guiding post 386, which is away from the bottom base 385, should be securely received in the metal receiving ring 3839.

In the present embodiment, the second receiving block 3856 also includes a second locating lateral face 3859 engaged with the first locating lateral face 3859. In other embodiments, the second receiving block 3856 may be omitted. In such cases, the second receiving portion 3858 can be directly defined in the bottom of the recess 3859.

The image sensor 35 is arranged on the circuit board 351 (see FIG. 1), and is opposite to the lens module 33. The circuit board 351 is arranged on the main body 10.

In operation, the magnetic field generated by the coil 39 with electric current flowing therein interacts with the magnetic field generated by the magnets 382 to drive the movable barrel 3831 to move along the guiding post 386 from an original position (not shown). Therefore, an inclination of the movable barrel 3831 can be avoided, and an accurate focus of the camera module 30 can be achieved. In addition, when the movable barrel 3831 arrives at a best shooting position, a static friction generated between the guiding post 386 and the metal receiving ring 3839 makes the movable barrel 3831 temporarily fixed at the best shooting position to shoot, such that the coil 39 can temporarily have no electric current flowing therein. Therefore, electric power can be reduced. When the shooting is completed, the restoring force supplied by the spring plate 384 can bring the movable barrel 3831 to the original position.

Figure 5:
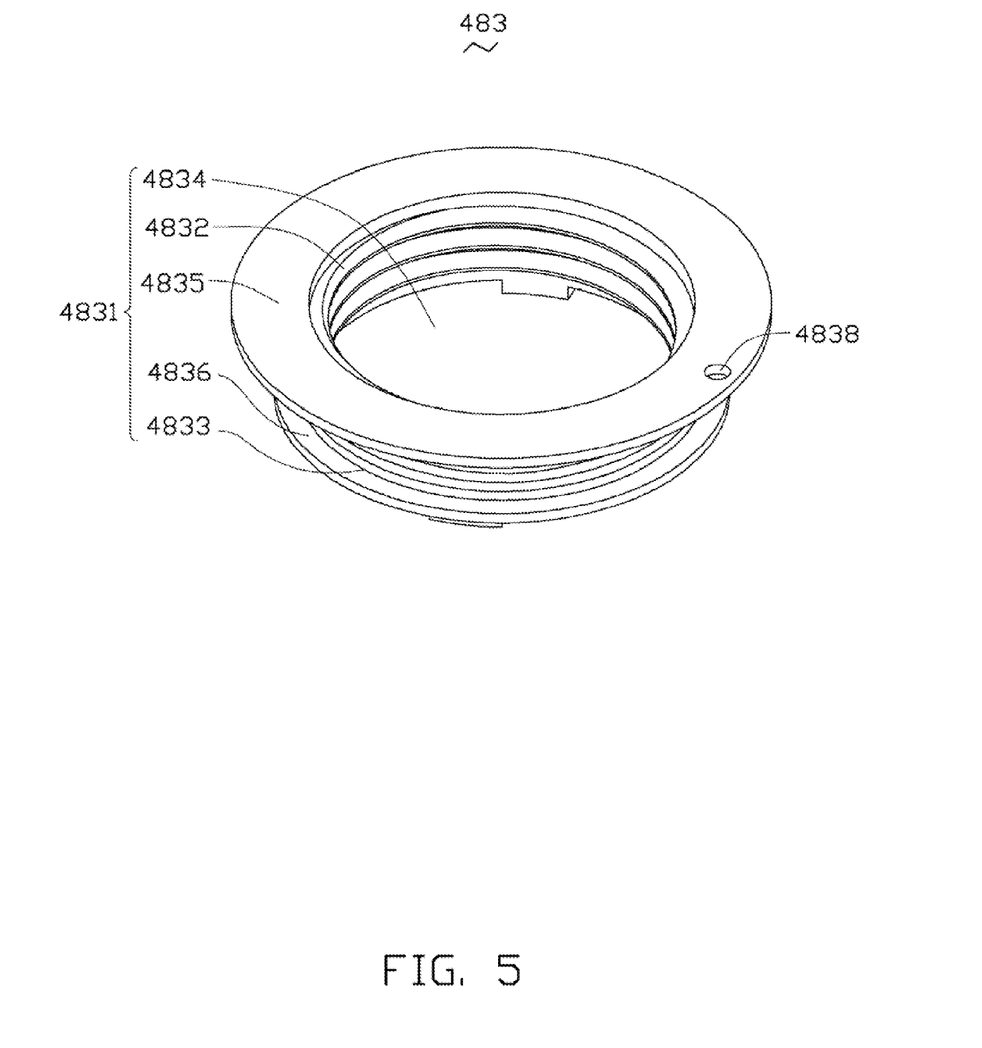
FIG. 5 is an isometric view of a movable unit according to a second embodiment.

Referring to FIG. 5, a movable unit 483, in accordance with a second embodiment, is shown. The movable unit 483 includes a movable barrel 4831. The movable barrel 4831 includes an upper end 4832 and a lower end 4833 facing away from the upper end 4832. The movable barrel 4831 defines a second receiving cavity 4834 passing through the upper end 4832 and the lower end 4833. The movable barrel 4831 also includes an upper endplate 4835 outwardly extending from the upper end 4832 along a circumferential direction of the second receiving cavity 4834, and a lower endplate 4836 outwardly extending from the lower end 4833 along the circumferential direction of the second receiving cavity 4834. The upper endplate 4835 protrudes outwardly with respect to the lower endplate 4836. A first receiving portion 4838 is defined in a part of the upper endplate 4835, which protrudes outwardly with respect to the lower endplate 4836. In the present embodiment, the first receiving portion 4838 is a through hole passing through the upper endplate 4835. In other embodiments, the first receiving portion 4838 may be a recess.

Figure 6:
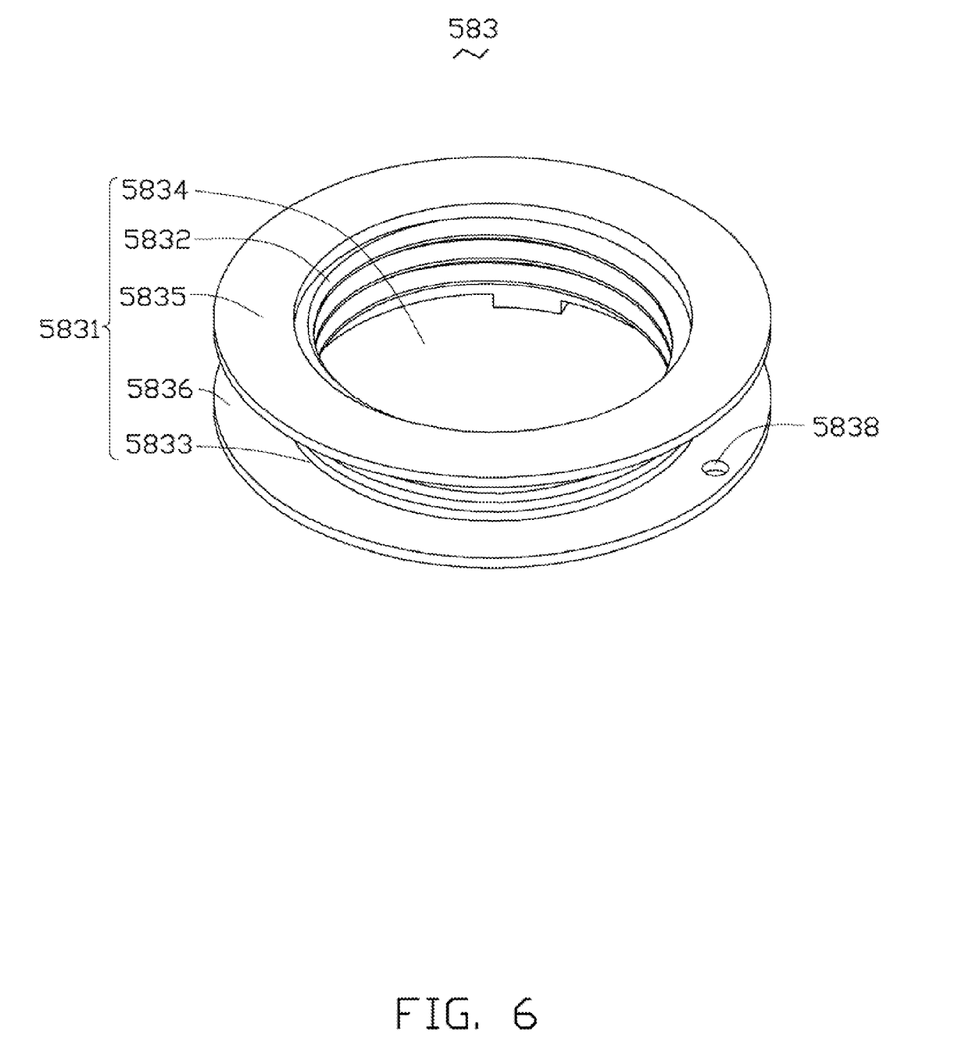
FIG. 6 is an isometric view of a movable unit according to a third embodiment.

Referring to FIG. 6, a movable unit 583, in accordance with a third embodiment, is shown. The movable unit 583 includes a movable barrel 5831. The movable barrel 5831 includes an upper end 5832 and a lower end 5833 facing away from the upper end 5832. The movable barrel 5831 defines a second receiving cavity 5834 passing through the upper end 5832 and the lower end 5833. The movable barrel 5831 also includes an upper endplate 5835 outwardly extending from the upper end 5832 along a circumferential direction of the second receiving cavity 5834, and a lower endplate 5836 outwardly extending from the lower end 5833 along the circumferential direction of the second receiving cavity 5834. A first receiving portion 5838 is defined in the lower endplate 5836. In the present embodiment, the first receiving portion 5838 is a through hole passing through the lower endplate 5836.

Figure 7:
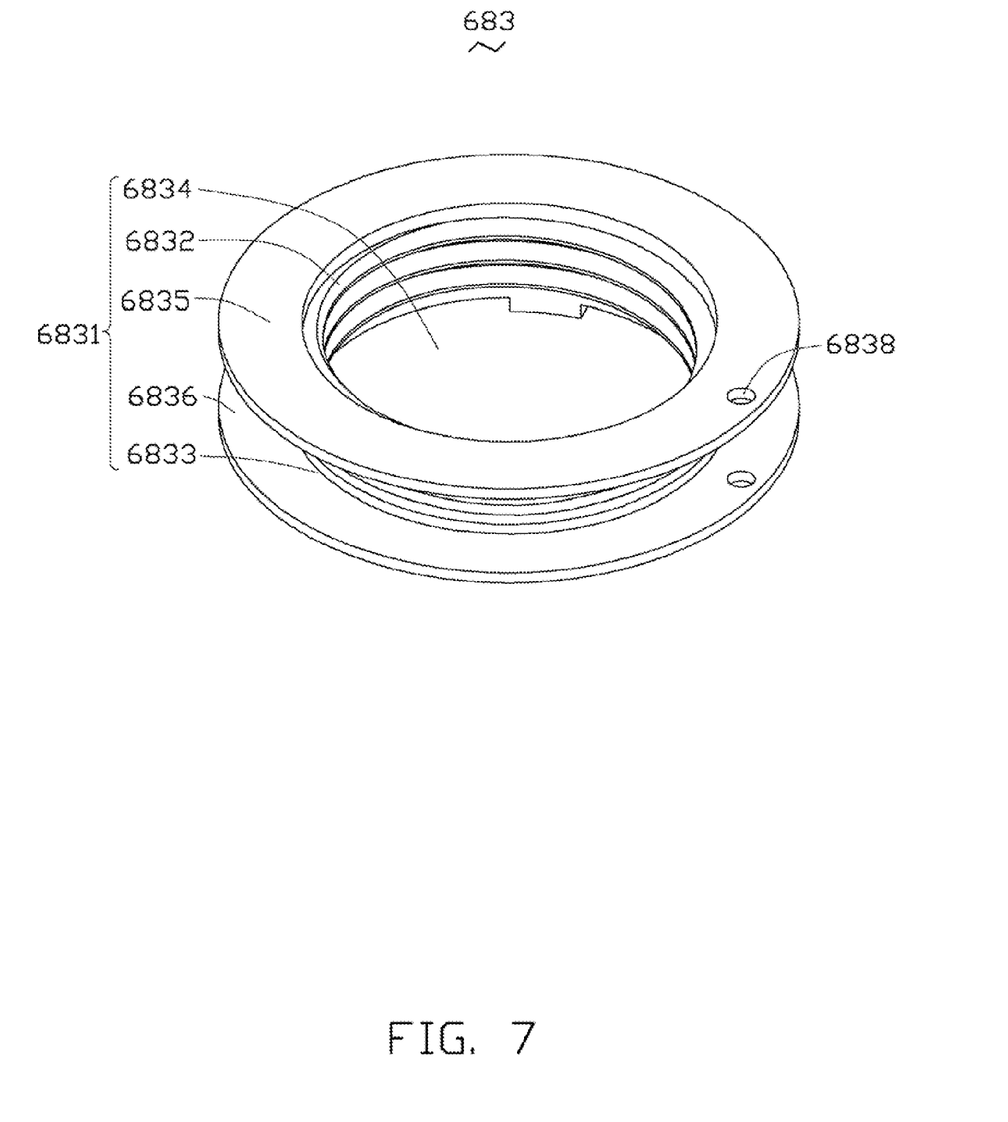
FIG. 7 is an isometric view of a movable unit according to a fourth embodiment.

Referring to FIG. 7, a movable unit 683, in accordance with a fourth embodiment, is shown. The movable unit 683 includes a movable barrel 6831. The movable barrel 6831 includes an upper end 6832 and a lower end 6833 facing away from the upper end 6832. The movable barrel 6831 defines a second receiving cavity 6834 passing through the upper end 6832 and the lower end 6833. The movable barrel 6831 also includes an upper endplate 6835 outwardly extending from the upper end 6832 along a circumferential direction of the second receiving cavity 6834, and a lower endplate 6836 outwardly extending from the lower end 6833 along the circumferential direction of the second receiving cavity 6834. A first receiving portion 6838 is defined in the upper endplate 5835 and the lower endplate 5836. In the present embodiment, the first receiving portion 5838 is a through hole passing through the upper endplate 5835 and the lower endplate 5836.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope and spirit of the appended claims.

What is claimed is:

1. A voice coil motor comprising:
    a shell, and
    a driving module received in the shell for driving a lens module, the driving module comprising:
        at least one magnet defining a first receiving cavity, the at least one magnet attached on an inner surface of the shell;
        a movable unit, the movable unit movably received in the first receiving cavity, the movable unit comprising a movable barrel and a coil wrapped around an outer sidewall of the movable barrel, the movable barrel being configured for receiving the lens module therein, a central axis of the movable barrel being coaxial with an optical axis of the lens module, the movable barrel comprising a first receiving portion, a central axis of the first receiving portion being parallel with the optical axis;
        a spring plate, the spring plate comprising a first fixed portion, a second fixed portion, and a spring connecting portion connecting the first fixed portion to the second fixed portion, the first fixed portion being fixed on the movable barrel, the second fixed portion comprising a fixed block, the fixed block comprising a first locating lateral face facing away from the first fixed portion;
        a bottom base, the second fixed portion being fixed on the bottom base, the bottom base comprising a receiving block, the receiving block of the bottom base comprising a second receiving portion, the receiving block of the bottom base also comprising a second locating lateral face engaged with the first locating lateral face, and
        a guiding post connecting the movable unit to the bottom base, one end of the guiding post received in the first receiving portion, and the other end of the guiding post received in the second receiving portion, the movable barrel being moveable along the guiding post.

2. The voice coil motor of claim 1, wherein the movable barrel comprises an upper end far away from the bottom base, a lower end facing away from the upper end, a second receiving cavity passing through the upper end and the lower end, an upper endplate outwardly extending from the upper end along a circumferential direction of the second receiving cavity, and a lower endplate outwardly extending from the lower end along the circumferential direction of the second receiving cavity.

3. The voice coil motor of claim 2, wherein the upper endplate protrudes outwardly with respect to the lower endplate, and the first receiving portion is defined in a part of the upper endplate which protrudes outwardly with respect to the lower endplate.

4. The portable electronic device of claim 3, wherein the driving module further comprises a top lid attached on the shell, the top lid defines a recess or a through hole at a corner thereof for receiving an end of the guiding post, and the magnets are attached on the top lid.

5. The portable electronic device of claim 4, wherein the first locating lateral face is an arc-shaped lateral face, an L-shaped lateral face, or an S-shaped lateral face.

6. A camera module comprising:
    a lens module, and
    a voice coil motor for driving the lens module to move, the voice coil motor comprising:
        a shell, and
        a driving module received in the shell for driving the lens module, the driving module comprising:
            at least one magnet defining a first receiving cavity, the at least one magnet attached on an inner surface of the shell;
            a movable unit, the movable unit movably received in the first receiving cavity, the movable unit comprising a movable barrel and a coil wrapped around an outer sidewall of the movable barrel, the movable barrel being configured for receiving the lens module therein, a central axis of the movable barrel being coaxial with an optical axis of the lens module, the movable barrel comprising a first receiving portion, and a central axis of the first receiving portion being parallel with the optical axis;
        a spring plate, the spring plate comprising a first fixed portion, a second fixed portion, and a spring connecting portion connecting the first fixed portion to the second fixed portion, the first fixed portion being fixed on the movable barrel, the second fixed portion comprising a fixed block, the fixed block comprising a first locating lateral face facing away from the first fixed portion;
        a bottom base, the second fixed portion being fixed on the bottom base, the bottom base comprising a receiving block, the receiving block of the bottom base comprising a second receiving portion, the receiving block of the bottom base also comprising a second locating lateral face engaged with the first locating lateral face, and
        a guiding post connecting the movable unit to the bottom base, one end of the guiding post received in the first receiving portion, the other end of the guiding post received in the second receiving portion, the movable barrel being moveable along the guiding post.

7. The camera module of claim 6, wherein the movable barrel comprises an upper end far away from the bottom base, a lower end facing away from the upper end, a second receiving cavity passing through the upper end and the lower end, an upper endplate outwardly extending from the upper end along a circumferential direction of the second receiving cavity, and a lower endplate outwardly extending from the lower end along the circumferential direction of the second receiving cavity.

8. The camera module of claim 7, wherein the upper endplate protrudes outwardly with respect to the lower endplate, and the first receiving portion is defined in a part of the upper endplate which protrudes outwardly with respect to the lower endplate.

9. The portable electronic device of claim 8, wherein the driving module further comprises a top lid attached on the shell, the top lid defines a recess or a through hole at a corner thereof for receiving an end of the guiding post, and the magnets are attached on the top lid.

10. The portable electronic device of claim 9, wherein the first locating lateral face is an arc-shaped lateral face, an L-shaped lateral face, or an S-shaped lateral face.

11. A portable electronic device comprising:
a main body, and
a camera module mounted on the main body, the camera module comprising:
a lens module, and
a voice coil motor for driving the lens module to move, the voice coil motor comprising:
a shell, and
a driving module received in the shell for driving a lens module, the driving module comprising:
at least one magnet defining a first receiving cavity, the at least one magnet attached on an inner surface of the shell;
a movable unit, the movable unit movably received in the first receiving cavity, the movable unit comprising a movable barrel and a coil wrapped around an outer sidewall of the movable barrel, the movable barrel being configured for receiving the lens module therein, a central axis of the movable barrel being coaxial with an optical axis of the lens module, the movable barrel comprising a first receiving portion, and a central axis of the first receiving portion being parallel with the optical axis;
a spring plate, the spring plate comprising a first fixed portion, a second fixed portion, and a spring connecting portion connecting the first fixed portion to the second fixed portion, the first fixed portion being fixed on the movable barrel, the second fixed portion comprising a fixed block, the fixed block comprising a first locating lateral face facing away from the first fixed portion;
a bottom base, the second fixed portion being fixed on the bottom base, the bottom base comprising a receiving block, the receiving block of the bottom base comprising a second receiving portion, the receiving block of the bottom base also comprising a second locating lateral face engaged with the first locating lateral face, and
a guiding post connecting the movable unit to the bottom base, one end of the guiding post received in the first receiving portion, the other end of the guiding post received in the second receiving portion, the movable barrel being moveable along the guiding post.

12. The portable electronic device of claim 11, wherein the movable barrel comprises an upper end far away from the bottom base, a lower end facing away from the upper end, a second receiving cavity passing through the upper end and the lower end, an upper endplate outwardly extending from the upper end along a circumferential direction of the second receiving cavity, and a lower endplate outwardly extending from the lower end along the circumferential direction of the second receiving cavity.

13. The portable electric device of claim 12, wherein the upper endplate protrudes outwardly with respect to the lower endplate, and the first receiving portion is defined in a part of the upper endplate which protrudes outwardly with respect to the lower endplate.

14. The portable electronic device of claim 13, wherein the driving module further comprises a top lid attached on the shell, the top lid defines a recess or a through hole at a corner thereof for receiving an end of the guiding post, and the magnets are attached on the top lid.

15. The portable electronic device of claim 14, wherein the first locating lateral face is an arc-shaped lateral face, an L-shaped lateral face, or an S-shaped lateral face.

* * * * *